Patented Oct. 2, 1951

2,569,954

UNITED STATES PATENT OFFICE 2,569,954

ADHESIVE FOR BONDING PLASTICIZED POLYVINYL HALIDE-CONTAINING RESIN SURFACES AND METHOD OF BONDING SUCH SURFACES

Clayton F. Ruebensaal, Baltimore, Md., assignor, by mesne assignments, to United States Rubber Company, New York, N. Y., a corporation of New Jersey No Drawing. Application June 27, 1946, Serial No. 679,864

4 Claims. (Cl. 154—140)

1

This invention relates generally to the art of synthetic resins and more particularly to a new adhesive for bonding plasticized polyvinyl halide-containing resins to plasticized polyvinyl halide-containing resins and to other resinous and non-resinous materials, and to a new method of so bonding such resins and to the resulting new bonded articles.

This application is a continuation-in-part of application Serial No. 537,365, filed May 25, 1944, now abandoned.

Efforts have been made heretofore to bond plasticized polyvinyl halide-containing resins but so far as I know the effects have not been commercially satisfactory. Such resins have oily surfaces which interfere with the bonding, due, I believe, to the presence of the plasticizer in the resin.

One such effort involved the dissolving of high molecular weight resins in a high boiling point solvent, the theory being that the solvent would penetrate through the oily film and into the piece of plasticized polyvinyl halide-containing resin. One difficulty with this proposed procedure was that the solvent could not readily be eliminated from the said plasticized resin due to the impermeability of the latter. It was proposed to eliminate the solvent by applying heat to the assembled pieces to volatilize the solvent and enable it to migrate through the piece of plasticized resin. However, the rate of migration was very slow and, even though the said piece was subjected to elevated temperatures for long periods of time, some of the solvent still remained in the resulting article. This process required so much time that it was commercially impracticable and, moreover, the resulting bond had inferior physical properties as compared with the piece of plasticized polyvinyl halide-containing resin, due to the solvent remaining in the bond.

Another effort involved the dissolving of a low molecular weight resin in a low boiling point solvent, the theory being that the solvent could be removed by heating. Although less solvent remained in the completed bond, the resin of the bond absorbed plasticizer from the adjacent piece or pieces of plasticized resin and consequently its initial physical properties deteriorated at a fairly rapid rate proportional to the rate of absorption of plasticizer.

So far as I am advised, no one heretofore has ever proposed an adhesive which could be used for more or less permanently bonding together two or more pieces of plasticized polyvinyl halide-containing resins or a commercially practicable method for making such a bonded article, and no one has ever made an article composed of such resins bonded together by a bond which was initially strong and flexible or elastic, and which did not materially weaken thereafter. Neither, to my knowledge, has anyone ever proposed an adhesive which could be used for permanently bonding plasticized polyvinyl halide-containing resin pieces to pieces of ferrous metal, aluminum, wood, leather and other materials containing no, or substantially no, plasticized polyvinyl halide-containing resin.

Briefly stated, the present invention contemplates an adhesive solution which will penetrate into a body of plasticized polyvinyl halide-containing resin and which can then be readily and simply converted substantially completely into solid polymerized material with coincident deposition of polymerized resins initially dissolved in the solution. The present invention also contemplates a new method of bonding plasticized resins to any one of a wide variety of materials by means of said adhesive solution, and also the resulting new bonded products.

In the practice of the present invention, the adhesive solution, which contains no substance which must be eliminated by volatilization from the bonded resin, or from the bond itself, is applied in any convenient manner to the surfaces of the pieces to be bonded, as by painting or brushing. The application may be made to either or both the pieces, as desired, and the pieces are then placed against each other so that surfaces bearing the adhesive solution are in contact. The assembled pieces are then subjected to a light pressure, such as about 5 p. s. i., thus to maintain the surfaces bearing the adhesive solution in intimate contact with each other. Simultaneously with the application of pressure, the assembly is subjected to a temperature sufficient to cause polymerization of monomeric and partially polymerized constituents of the adhesive solution. A temperature of about 60° C. is usually adequate for this polymerization purpose and results in reasonably rapid polymerization and bonding, especially if the polymerizing reaction is exothermic and artificial cooling is not effected. As polymerization proceeds, the solution becomes progressively more viscous and finally becomes solid with the result that the originally dissolved materials are progressively deposited as fine solid particles and, when polymerization is substantially complete, are interspersed in the polymerized material originally comprising the solvent portion of the solution. As a final step, the pressure on the pieces is relieved and the resulting composite article is cooled.

The adhesive solution should, of course, contain a material in liquid form capable of being converted into solid form by polymerization under practical circumstances of time, temperature and pressure, and should also contain a substance capable of withstanding the penetrating and bond-destroying tendencies of plasticizers commonly employed in producing plasticized polyvinyl halide-containing resins, such as dibutyl phthlate and tricresyl phosphate. This substance should be appreciably soluble in, and compatible with, said liquid material so that a solution of the substance may be readily prepared. A solution which I have found particularly suitable for producing bonds and securing plasticized polyvinyl halide-containing resins to each other and to other materials, such as steel and leather comprises methyl methacrylate monomer, methyl methacrylate polymer, vinyl chloride-vinyl acetate-maleic acid tripolymer, and benzoyl peroxide. The tripolymer of this mixture preferably consists of about 85% vinyl chloride, about 13% vinyl acetate and about 2% maleic acid, and preferably constitutes about 13% by weight of the adhesive composition, but may suitably range between about 7% and about 25% of the weight of the solution. Depending upon the amount of tripolymer employed in the mixture, the fluidity desired in the mixture, the polymerizing circumstances to be employed, and the materials available, the methyl methacrylate polymer content of this solution may desirably range from about 12% to about 25% without impairing the strength or elasticity of the resulting bonds. The benzoyl peroxide, which those skilled in the art will recognize as a conventional polymerization catalyst having a number of well known equivalents, suitably constitutes about 3% by weight of the adhesive composition, but may vary from about 1% to about 5%, depending upon individual desires. Thus these three ingredients may vary from about 20% to about 55% of the solution, and the solvent, methyl methacrylate, may thus vary between about 80% and about 45% of the adhesive solution.

A specific example of such an adhesive solution has the following formulation, the percentages being by weight:

65% methyl methacrylate monomer
19% methyl methacrylate polymer
13% tripolymer of about 85% vinyl chloride, about 13% vinyl acetate and about 2% maleic acid
3% benzoyl peroxide Employing this adhesive composition, I have within 15 minutes obtained an inseparable bond between two plasticized polyvinyl halide-containing resin pieces by subjecting them to a temperature of 100° C., after the manner above described. I have further obtained an inseparable bond between a plasticized polyvinyl halide-containing resin piece and anodized aluminum under the same time and temperature circumstances, and I have similarly obtained an inseparable bond between a plasticized polyvinyl halide-containing resin piece and phenolic precoated wood. Also, under the same time and temperature circumstances, I have obtained with this composition a bond between plasticized polyvinyl halide-containing resin and sand blasted steel, which bond pulled apart only a distance of 4 inches in 4 minutes under a pulling stress of 30 pounds per inch of bond width. Using this solution, I have even obtained a strong and durable bond between a piece of plasticized polyvinyl halide-containing resin and leather precoated with a 20% solution of the aforementioned triploymer in methyl ethyl ketone. This bond, under a tearing stress of 10 pounds per inch of bond width, was torn apart only 4 inches in a 4 minute period.

From the following additional illustrative, but not limiting, examples of this invention as I have actually practiced it, those skilled in the art may gain a further understanding of this invention and its commercial possibilities:

*Example I*

A piece of vinyle resin containing 45% by weight of tricresyl phosphate was painted along one surface with an adhesive composition comprising 8.85% vinyl chloride-vinyl acetate copolymer containing 90% vinyl chloride, 88.50% methyl methacrylate monomer, and 2.65% benzoyl peroxide. A second piece of the same vinyl resin composition was placed in contact along one surface with the said painted surface and the assembly was subjected to a pressure of 5 p. s. i. to maintain the said surfaces in contact, and was subjected to a temperature of 90° C. for 2.3 hours to cure the adhesive material. Upon relief of the pressure and cooling, the resulting article, which had all the elasticity of the original pieces, was subjected to a test to determine the strength of the resulting bond and it was found to be inseparable.

*Example II*

Another pair of vinyl resin pieces of the composition of those of the above example was similarly treated except that the adhesive solution employed consisted of 76.3% vinyl acetate monomer, 19% methyl methacrylate polymer (Lucite) and 4.7% benzoyl peroxide, and except that the temperature employed was 80° C. and the curing period was 2 hours. The resulting bonded article had all the elasticity of the original pieces and a considerable strength, peeling only 4 inches in 4.9 minutes under a stress of 4.75 pounds per inch of bond width.

*Example III*

A third pair of these resin pieces was similarly treated except that the adhesive solution employed consisted of 8.85% vinyl chloride-vinyl acetate copolymer containing 90% vinyl chloride, 88.50% ethyl methacrylate monomer and 2.65% benzoyl peroxide, and the assembly was subjected to a temperature of 90° C. for a period of 2 hours. The resulting article was fully as elastic as the original pieces and its component parts were firmly bonded together. Under test the pieces peeled apart a distance of 4 inches in 16.2 minutes under a stress of 2 pounds per inch of bond width.

*Example IV*

Using a solution consisting of 59.10% methyl methacrylate monomer, 8.84% vinyl chloride-vinyl acetate copolymer containing 90% vinyl chloride, 29.5% diallyl succinate and 2.65% benzoyl peroxide, and applying it in the manner above described to pieces of vinyl resin of the composition set out in Example I, I obtained, after subjecting the assembly to a pressure of 5 p. s. i. and a temperature of 90° C. for 2 hours, a strong and elastic bond. Under a stress of 2 pounds per inch of bond width the pieces peeled apart a distance of 4 inches in 4.4 minutes.

Example V

Employing two pieces of the vinyl resin described in Example I and applying the adhesive solution in the manner set out in Example I, I obtained in 2 hours a strong and elastic bond between the pieces. The curing temperature was 90° C. The adhesive composition employed contained 8.85% polyvinyl chloride in place of the vinyl chloride-vinyl acetate copolymer used in Example I, but was otherwise the same as the adhesive solution of Example I. The pieces peeled apart a distance of 4 inches in ½ minute under a stress of 2 pounds per inch of bond width.

Example VI

Again employing a pair of vinyl resin pieces such as used in Example I, I obtained a bond which permitted peeling of the pieces apart a distance of only 4 inches in 13.3 minutes under a stress of 2 pounds per inch of bond width. The adhesive composition employed was the same as that set out in Example I except that a relatively low molecular weight vinyl chloride-vinyl acetate copolymer containing 86% vinyl chloride was employed. The curing circumstances differed from that of Example I in that the period was 2 hours and the temperature 80° C.

Example VII

By using an adhesive composition consisting of 79.5% methyl methacrylate monomer, 7.9% vinyl chloride-vinyl acetate copolymer containing 90% vinyl chloride, 4.7% methyl methacrylate polymer and 7.9% acetyl benzoyl peroxide, and curing circumstances of 80° C. and 2 hours, I bonded vinyl resin pieces of the type described in Example I and obtained an article which pulled apart through the bond a distance of 4 inches in 4 minutes under 9.1 pounds per inch of bond width. Using a piece of said vinyl resin and a piece of sand blasted steel, I produced a composite article, using this adhesive substance, which pulled apart a distance of 4 inches in 4 minutes under a stress of 12.5 pounds per inch of bond width. I prepared another composite article, employing a similar vinyl resin piece and a phenolic cement (such as the phenolic cement RS216 sold by the Casein Company of America) precoated wood, which pulled apart through the bond a distance of 4 inches in 4 minutes under a stress of 4.2 pounds per inch of bond width.

Example VIII

Using an adhesive composition consisting of 79.2% methyl methacrylate monomer, 11.9% methyl methacrylate polymer, 7.9% coumarone indene polymer and 1% acetyl benzoyl peroxide, I prepared three composite articles, using the materials and curing circumstances set out in Example VII. The vinyl resin-vinyl resin composite pulled apart through the bond a distance of 4 inches in 4 minutes under a stress of 13.8 pounds per inch of bond width. The vinyl resin-sand blasted steel composite pulled apart a similar distance in a similar time under a stress of 1.2 pounds per inch of bond width. The vinyl resin-phenolic precoated wood composite pulled apart the same distance in the same time under a stress of 3.1 pounds per inch of bond width.

Example IX

I have prepared similar to those of Examples VII and VIII under the same curing circumstances and from the same materials, except that the adhesive composition consisted of 78.72% furfural, 21.20% methyl methacrylate polymer and 0.08% concentrated hydrochloric acid. The vinyl resin-vinyl resin article pulled apart a distance of 4 inches in 4 minutes under a stress of 11.3 pounds per inch of bond width, while the vinyl resin-sand blasted steel pulled apart the same distance in the same time under a stress of 2 pounds per inch of bond width, and the vinyl resin-phenolic precoated wood composite similarly pulled apart under a stress of 1 pound per inch of bond width. A fourth composite which consisted of a piece of vinyl resin of the type described in Example I and a piece of 24ST Alclad aluminum similarly pulled apart through the bond under a stress of 5.4 pounds per inch of bond width.

Example X

A composite article consisting of two vinyl resin pieces of the composition aforementioned, and a bond between the pieces, was produced in 2 hours by the application to the pieces of a temperature of 80° C. This article was pulled apart through the bond a distance of 4 inches in 4 minutes under a stress of 5.7 pounds per inch of bond width. A vinyl resin-sand blasted steel composite article was similarly produced and it similarly peeled or pulled apart through the bond under a stress of 4.6 pounds per inch of bond width. A third composite article consisting of a vinyl resin piece and a piece of phenolic precoated wood was similarly produced and similarly peeled apart through the bond under a stress of 1.2 pounds per inch of bond width. A composite article comprising a piece of vinyl resin and a piece of leather was similarly peeled apart under a stress of 7.6 pounds per inch of bond width. The adhesive employed consisted of 79.2% methyl methacrylate monomer, 11.9% methyl methacrylate polymer, 7.9% vinyl acetate polymer and 1% benzoyl peroxide.

In all the foregoing instances, the bonds obtained were elastic and the resulting composite articles were therefore of great utility. I attribute the elastic characteristic of the bonds to the plasticizing action of the low molecular weight constituents upon the high molecular weight constituents. In any event, however, these bonds range from those which might be regarded merely as "flexible," i. e., capable of being repeatedly bent through 180° without cracking or breaking, to those which are highly elastic and capable of incorporation in articles consisting otherwise of elastomeric or rubber-like materials without substantially decreasing the rubber-like or elastic properties of such articles.

I believe that when adhesive solutions of this invention are applied to plasticized polyvinyl halide-containing resin pieces, or to pieces of generally similar characteristics, these solutions penetrate the oily surface films and enter the lattices of the pieces. I further believe that as the monomeric constituents in the solutions polymerize, they are progressively deposited in those lattices in the form of minute solid particles; and that as polymerization proceeds, continuous structures are formed, which contain said solid particles and which connect the pieces comprising the assembly or article. Also, I believe that these dispersed, minute, solid particles act as plasticizers for the substantially continuous structures. It is to be understood, however, that I do not intend any limitations upon this invention or the appended claims by setting forth this theory.

but rather merely intend to offer further explanation of the discovery upon which this present invention is predicated.

From the foregoing description and the above examples, those skilled in the art will appreciate that certain criteria may be established for the various constituents of the adhesive compositions of this invention. The solvent portion of the compositions, for instance, should be capable of dissolving the normally solid or semi-solid polymeric constituents and any other non-liquid constituents, and should be miscible with the plasticizer of the pieces to be formed into the composite article. Also the solvent should polymerize at a temperature below the deformation temperature of the pieces which are to make up the composite articles, and should not be so volatile as to evaporate from the painted film before the surfaces of the articles to be bonded and formed into the desired composite articles can be brought together. Also, when the polymer to be dissolved has a high molecular weight, the polymerizable solvent should have a low molecular weight after being polymerized; and when the polymer to be dissolved has a low molecular weight, the solvent should have a high molecular weight after being polymerized.

The solvent may comprise a liquid monomer, or a liquid partially polymerized monomer, or a mixture of such materials. Solvents which may be used with low molecular weight polymers, such as polyvinyl acetate, various copolymers of vinyl chloride and vinyl acetate including those containing as much as about 90% of vinyl acetate, and polymerized polystyrene, include styrene, methyl methacrylate, ethyl methacrylate, propyl methacrylate, methyl ethacrylate, ethyl ethacrylate, and other esters of acrylic acid or acrylic acid homologs. Solvents which may be used with the high molecular weight polymers, such as polymers of vinyl chloride, methacrylate (Lucite), ethyl methacrylate, ethyl ethacrylate, methyl ethacrylate, propyl ethacrylate and polystyrene, include their respective monomers and partially polymerized monomers. As those skilled in the art are aware, methyl methacrylate polymer-monomer mixtures are not, under ordinary circumstances, solidifiable in the manner essential to the success of the present invention. Such mixtures are therefore not contemplated by the appended claims, but it should be understood that mixtures containing methyl methacrylate polymer and monomer plus another resinous material, such as polyvinyl chloride, are suitable for my purposes and are contemplated by the appended claims. Two or several solvents may be employed together and two or several polymerized solutes may be employed together in the same mixture. Under certain circumstances, as shown in Examples 8 and 9, furfural may be employed as the solvent portion of the mixture and coumarone indene polymer may be used as the solute. The solvent may suitably range from about 45 to about 95 parts, while the polymer or solute portion of the adhesive solution may range from about 55 to about 5 parts of said solution.

When it is desired to bond a metal piece, such as a piece of iron or steel, to a piece of plasticized polyvinyl halide-containing resin, the adhesive solution may desirably contain a highly polar substance, such as maleic acid, which is compatible both with the remaining constituents of the said solution and the resinous piece to be bonded. The presence of a highly polar substance, when metals are not involved in the production of a composite article by means of this invention, is not ordinarily important or helpful, and, in some cases, is not particularly desirable, especially where there is actually some incompatibility between the polar substance and other materials making up the composite article.

For best results, the non-resinous pieces to be used in preparing composite articles with plasticized polyvinyl halide-containing resin pieces should be treated in a particular manner prior to attempting attachment of the resinous pieces. In the case of ferrous articles I have found smooth surfaces not conducive to the establishment of a bond of the kind described herein. I therefore sand blast the surfaces to be bonded, but contemplate any equivalent surface roughening method. I have found that leather is rendered more receptive to such bonds when it is primed with a coating of vinyl resin, preferably the type of resin employed in the adhesive solution. Aluminum is improved for this bonding purpose when it has been freshly cleaned as by electrolytic (anode) polishing, and wood is improved for this purpose when provided with a phenolic pre-coating.

The catalysts, benzoyl peroxide, acetyl benzoyl peroxide and hydrochloric acid mentioned in the foregoing specific illustrations, may be replaced by hydrogen peroxide, lauroyl peroxide, sulfuric acid or any equivalent polymerization-promoting catalyst. The catalyst may be present in amount ranging up to about 10% by weight of the total solvent. To promote polymerization ultra violet light may be used alone or with any of these peroxides when the resin sheets are transparent or translucent. When the sheets are not transparent heat may be used alone or in combination with another suitable polymerization catalyst. However, it is preferable to use a suitable peroxide together with heat for this combination causes a rapid polymerization of the monomer.

Wherever proportions or percentages are expressed herein, and in the appended claims, the weight basis is referred to unless the contrary is specifically stated.

The term "low molecular weight resin" as used herein means and includes resins which have molecular weights ranging up to a maximum of about 20,000 as determined by the Staudinger viscosity method and which are capable of acting as plasticizers for high molecular weight resins. The term "high molecular weight resin" as used herein means and includes resins which have molecular weights ranging above a minimum of about 20,000 as determined by the same method, and which are capable of resisting the swelling or dissolving action of the plasticizers used in the resins to be bonded.

Although the foregoing detailed description deals to a large extent with thermoplastic high molecular weight resins, it will be understood that certain cross linked or three dimensional polymers such as are found in Example IV are within the scope of my invention in that they are compatible and resist the swelling or dissolving action of a plasticizer in the polyvinyl halide-containing resin body.

Having thus described the present invention so that those skilled in the art may be able to practice and understand the same, I state that what I desire to secure by Letters Patent is defined in what is claimed.

What is claimed is:

1. An adhesive solution particularly adapted to bond a solid surface of a plasticized polyvinyl halide-containing resin and another surface upon heating to a polymerization temperature an assembly of said surfaces pressed together with said solution therebetween, said solution consisting essentially of from 7 to 25 per cent by weight of a tripolymer consisting of about 85 per cent vinyl chloride, about 13 per cent vinyl acetate and about 2 per cent maleic acid, from 12 to 25 per cent by weight of methyl methacrylate polymer, and from 1 to 5 per cent by weight of a polymerization catalyst, dissolved in from 80 to 45 per cent by weight of monomeric methyl methacrylate, said percentages totalling 100 per cent.

2. An adhesive solution particularly adapted to bond a solid surface of a plasticized polyvinyl halide-containing resin and another surface upon heating to a polymerization temperature an assembly of said surfaces pressed together with said solution therebetween, said solution consisting essentially of 13 per cent by weight of a tripolymer of about 85 per cent vinyl chloride, about 13 per cent vinyl acetate and about 2 per cent maleic acid, 19 per cent by weight of methyl methacrylate polymer, and 3 per cent by weight of benzoyl peroxide, dissolved in 65 per cent by weight of monomeric methyl methacrylate, said percentages totalling 100 per cent.

3. The method of effecting a bond between a surface of a plasticized polyvinyl halide-containing resin and another surface which comprises coating one of said surfaces with a solution consisting essentially of from 7 to 25 per cent by weight of a tripolymer consisting of about 85 per cent vinyl chloride, about 13 per cent vinyl acetate and about 2 per cent maelic acid, from 12 to 25 per cent by weight of methyl methacrylate polymer, and from 1 to 5 per cent by weight of a polymerization catalyst, dissolved in from 80 to 45 per cent by weight of monomeric methyl methacrylate, said percentages totalling 100 per cent, pressing the two surfaces together with the coating of said solution therebetween, and simultaneously effecting polymerization of the polymerizable portion of said solution by subjecting the assembly to an elevated temperature.

4. The method of effecting a bond between a surface of a plasticized polyvinyl halide-containing resin surface and a surface of sand blasted steel which comprises coating one of said surfaces with a solution consisting essentially of 13 per cent by weight of a tripolymer consisting of about 85 per cent vinyl chloride, about 13 per cent vinyl acetate and about 2 per cent maleic acid, 19 per cent by weight of methyl methacrylate polymer, and 3 per cent by weight of benzoyl peroxide, dissolved in 65 per cent by weight of monomeric methyl methacrylate, said percentages totalling 100 per cent, pressing the two surfaces together with the coating of said solution therebetween and simultaneously effecting polymerization of the polymerizable portion of said solution by subjecting the assembly to an elevated temperature.

CLAYTON F. RUEBENSAAL.

REFERENCES CITED

The following references are of record in the file of this patent:

UNITED STATES PATENTS

| Number | Name | Date |
| --- | --- | --- |
| 1,935,577 | Reid | Nov. 14, 1933 |
| 2,116,318 | Miles | May 3, 1938 |
| 2,234,621 | Brous | Mar. 11, 1941 |
| 2,268,611 | Mitchell | Jan. 6, 1942 |
| 2,315,503 | Crowell | Apr. 6, 1943 |
| 2,323,562 | Nugent | July 6, 1943 |
| 2,329,456 | Campbell | Sept. 14, 1943 |
| 2,345,013 | Soday | Mar. 28, 1944 |
| 2,349,508 | Mack | May 23, 1944 |
| 2,366,049 | Payne et al. | Dec. 26, 1944 |
| 2,367,670 | Christ | Jan. 23, 1945 |
| 2,407,143 | Daur | Sept. 3, 1946 |
| 2,427,519 | Blyler | Sept. 16, 1947 |

OTHER REFERENCES

"Vinylite Elastomeric Compounds Plastics-Bonding," published 1944 by Carbide and Carbon Chem. Corp., New York, pages 6 and 7.